United States Patent [19]

Janex

[11] Patent Number: 5,307,074
[45] Date of Patent: Apr. 26, 1994

[54] COLLISION AVOIDANCE SYSTEM FOR SEA NAVIGATION

[75] Inventor: Albert Janex, Cachan, France

[73] Assignee: LMT Radio Professionnelle, Boulogne Billancourt, France

[21] Appl. No.: 47,356

[22] Filed: Apr. 19, 1993

Related U.S. Application Data

[63] Continuation of Ser. No. 758,216, Sep. 12, 1991, abandoned, which is a continuation of Ser. No. 641,804, Jan. 16, 1991, abandoned, which is a continuation of Ser. No. 498,446, Mar. 16, 1990, abandoned, which is a continuation of Ser. No. 167,475, Apr. 25, 1988, abandoned.

[30] Foreign Application Priority Data

Jul. 4, 1986 [FR] France ................. 8609763

[51] Int. Cl.$^5$ ............ G01S 13/00; G01S 13/74; G01S 3/02
[52] U.S. Cl. .................... 342/41; 342/43; 342/57; 342/455
[58] Field of Search .......... 342/176, 182, 43, 50, 342/41, 46, 455, 55, 456, 57, 58

[56] References Cited

U.S. PATENT DOCUMENTS

| | | | |
|---|---|---|---|
| 2,976,529 | 3/1961 | McNaney | 342/43 |
| 3,310,806 | 3/1967 | Stansbury | 364/461 |
| 3,772,692 | 11/1973 | Braddon | 342/41 |
| 3,900,846 | 8/1975 | Gibbon | 342/43 |
| 3,971,018 | 7/1976 | Ibister et al. | 342/41 |
| 4,104,638 | 8/1978 | Middleton | 342/455 |
| 4,438,438 | 3/1984 | Arens et al. | 342/451 |
| 4,590,569 | 5/1986 | Rogoff et al. | 364/452 |
| 4,684,949 | 8/1987 | Kalafus | 342/41 |
| 4,706,090 | 11/1987 | Hashiguchi et al. | 342/41 |

OTHER PUBLICATIONS

Herther et al. "A Fully Automatic Marine Radar Data Plotter", Jnl Inst. Nav. vol. 24, No. 1, (Jan. 1971) pp. 43–49.

Primary Examiner—Gregory C. Issing
Attorney, Agent, or Firm—Oblon, Spivak, McClelland, Maier & Neustadt

[57] ABSTRACT

A collision avoidance system for sea navigation comprises, for each equipped ship, a transmitter that repeatedly transmits the geographic coordinates, course and speed of its own ship and a receiver that sends a display device similar data received from other ships. These received data are displayed, mostly in the form of symbols, on the panoramic screen of the display device.

8 Claims, 1 Drawing Sheet

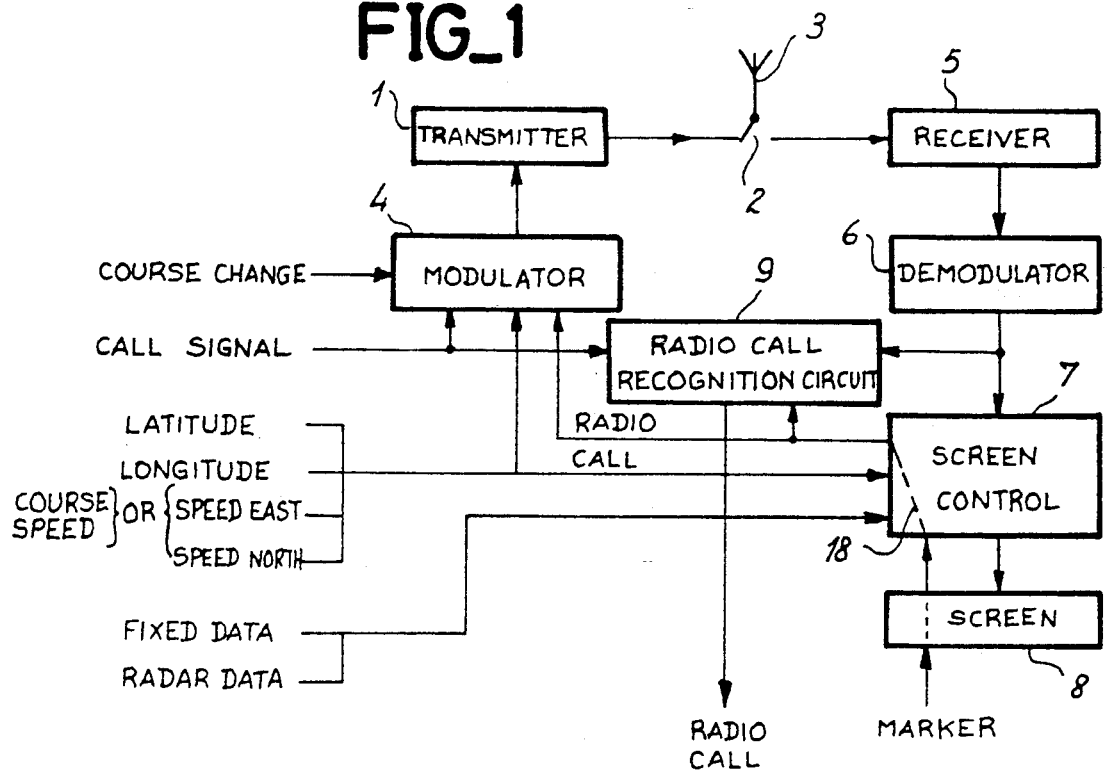
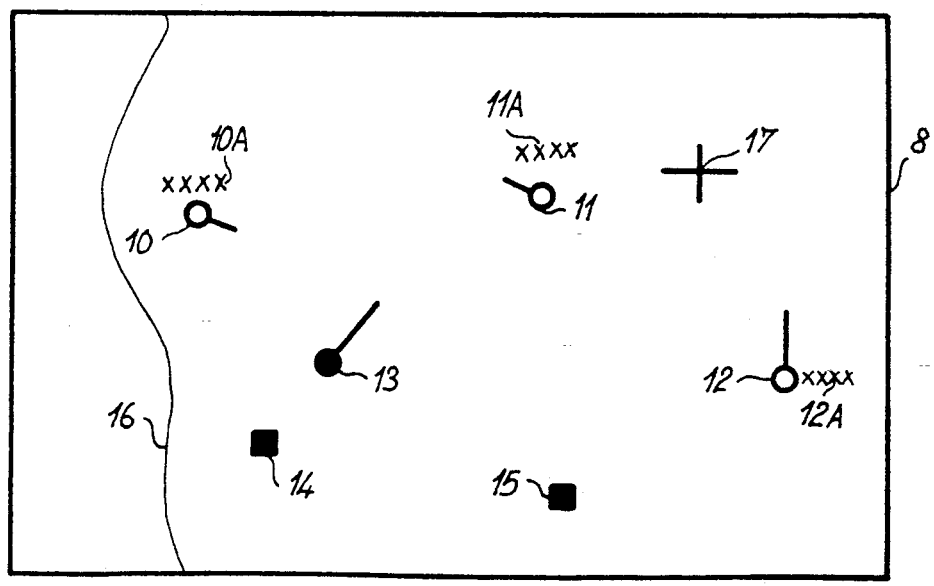

COLLISION AVOIDANCE SYSTEM FOR SEA NAVIGATION

This application is a continuation of application Ser. No. 07/758,216, filed on Sep. 12, 1991, now abandoned, which is a continuation of USSN 07/641,804 filed Jan. 16, 1991; which is a cont. of USSN 07/498,446 filed Mar. 16, 1990; which is a cont. of USSN 07/167,475 filed Apr. 25, 1988, all of which are now abandoned.

BACKGROUND OF THE INVENTION

1. Field of the Invention

An object of the present invention is a collision avoidance system for sea navigation.

2. Description of the Prior Art

At present, the only available form of aid for collision avoidance in sea navigation is primary radar. Every vessel fitted with this radar obtains data on its immediate environment, namely the relative position of the said vessel with respect to other vessels and with respect to any obstacle large enough to be detected by radar such as buoys, coasts, etc. However, a radar of this type gives no data or very little data on the nature of the objects detected (for example, data on the type of ship), the speed of these objects and their maneuvering intentions if any. Any concerted maneuvers by ships in the same zone can be conducted only by radio on channels which are very busy nowadays. Calls cannot be made because the identity of the ship being called is not known, and these calls are therefore ineffective.

SUMMARY OF THE INVENTION

An object of the present invention is a method by which ships located in the same geographic zone can automatically and constantly keep one another informed about their respective movements in order to avoid collisions and in order to give them greater maneuvering ease when they are highly concentrated in this geographic zone.

Another object of the present invention is a device to implement the method, a device which is easy to use and which can provide the maximum amount of data in the clearest possible way.

According to the method of the present invention, each vessel, while occupying a channel common to all the vessels concerned for as brief a period as possible, repeatedly transmits encoded data on its geographic position, speed, course and identification, and receives similar data from surrounding ships, the said data being displayed by symbols on a panoramic type of screen.

The system of the invention includes, for each ship equipped with the said system, a panoramic type of display device connected to a radio navigation device itself connected, through a modulator, to a transmitter which is locked into a frequency common to the system. The said system of the invention further includes a receiver, also locked into this frequency, connected to the display device though a demodulator.

BRIEF DESCRIPTION OF THE DRAWINGS

The present invention will be better understood from the following detailed description of an embodiment, taken as a non-restrictive example and illustrated by the appended drawings of which:

FIG. 1 is a block diagram of a device with which a ship is equipped and which forms part of the system according to the invention, and FIG. 2 is a front view of an example of a screen of the display device of the equipment of FIG. 1.

DESCRIPTION OF A PREFERRED EMBODIMENT

Each ship that participates in the collision avoidance system of the invention is equipped with a device such as one shown schematically in FIG. 1. Such a ship is hereinafter called an equipped ship.

The device shown in FIG. 1 has a transmitter 1 that transmits messages intermittently with a very small (about $10^{-4}$ to $10^{-5}$) mean load ratio (defined as the ratio of the transmission time to the stopping time). The transmission power and frequency are chosen so as to limit the range of the transmitter 1 to a few tens of kilometers. The limit may be that caused by the earth's curvature if a transmission frequency is chosen where the propagation occurs done in a direct line of view, for example, a UHF band frequency (several hundreds of MHz) or more without, however, going beyond the X band so that the propagation will remain practically unaffected by weather conditions. The frequency $F_o$ of the transmitter is the same for all the transmitters and receivers of the system.

The transmitter 1 is connected through a switch 2 to an antenna 3 made so as to provide omnidirectional transmission in the horizontal plane.

The transmitter 1 is furthermore connected to a modulator 4. This modulator 4 prepares a byte assembling all the data to be transmitted, and transposes it into a signal modulating the transmitter 1. The form of modulation is of the impulse type so that there is no transmission at all outside the time when the message is transmitted. However, the type of data modulation itself is not laid down by the method of the invention: each bit may be encoded according to any known encoding techniques such as, for example, pulse position coding or phase shift keying.

The transmitted message includes the following data:

the ship's coordinates, preferably in terms of latitude and longitude, each encoded, for example, in 22 bits: These coordinates are given by the ship's radio navigation system. Ships are generally equipped with radio navigation instruments that permanently, precisely and reliably give them their absolute geographical position. The precision required by the collision avoidance method of the invention is about 100 meters. The radio navigation system known as NAVSTAR, for example, meets these conditions.

the identity of the ship, to which about 20 bits may be advantageously allocated: This datum is given permanently by an appropriate circuit: for example a pre-cabled circuit, a read-only memory, a random-access memory supplied with data by a keyboard, etc. This identity datum may be used to facilitate a radiophonic link or to summarily identify the type of ship (for example, oil tanker, ferry boat, cargo ship, etc.), and in this case, a few bits of the identity word may be reserved to identify the type of ship.

the speed and course of the ship: this data is generally available on every ship, at least in analog form, and it suffices to convert it into digital form. The speed and course data may be encoded with adequate precision by 6 and 8 bits respectively.

if necessary (if the standard stipulates it) changes in course encoded by two bits (portside or starboard turning): A datum of this type may be given automatically by any known device that indicates rotational direction, activated from the very beginning of the maneuver. The standard may also require information that is more extensive and more predictive than simply the indication of a change in course, i.e. the value of the future course. But this would require its manual entry(by keyboard) with the risk of oversight on the part of the operator.

Advantageously, this information is preceded, according to a standard technique for message transmission, by a preamble which initializes certain circuits of the receiver. Again, advantageously, this information is complemented by bits forming an "end of message" symbol and, if it is thought that the permanent repetition of the messages is not sufficient to eliminate all error, error-correcting bits (parity bits for example) may be added.

As specified above, if the ship is fitted with a NAVSTAR type radio navigation receiver, this receiver gives most of the above-mentioned data with far greater precision than is needed for the system of the invention. In this case, for each datum, the superfluous least significant bits may be overlooked, and only those considered to be significant, with requisite and adequate precision to implement the method of the invention as specified above, may be retained. Thus, the length of the message transmitted is about 100 bits. If the passband allocated to the system is in the range of a few megahertz, the message is transmitted within a few tens of microseconds.

If each equipped ship transmits a message of this type with a periodicity of about 1 second, the traffic load induced by a ship in the system ranges between $10^{-4}$ and $10^{-5}$. If, for example, there are about a hundred ships simultaneously present in the same geographical zone (for example a port), the traffic load on the system is only $10^{-2}$ to $10^{-3}$, thus ensuring a high probability that the messages will not interfere with one another. Moreover, it must be noted that we have chosen a relatively unfavorable example here, since the maneuvering time for ships to avoid collision is far greater than one second and the message repetition period can be greatly increased, thus reducing the probability of mutual interference by messages.

According to an advantageous characteristic of the invention, the transmission instant of each message is made random because mutual interference is still possible owing to the non-synchronization of transmissions from different ships. Thus, the above-mentioned example of a repetition period of one second represents only a mean statistical value and the real repetition period will be wide ranging. The result of this is that any garbled message received by a given ship will not be garbled all the time. Furthermore, the high redundancy of the messages sent (for a periodicity of about one second, the same message is repeated several times before a significant change of course and/or speed and/or geographic postion) makes it possible to overlook the message received in garbled form.

Outside the brief transmission periods of the transmitter 1, the switch 2 connects the antenna 3 to a receiver 5 which is locked into the common frequency of the system. The receiver 5 is connected to a data demodulator 6 that extracts data from the signal received by performing, in reverse, the operations performed in the modulator 4.

The demodulator 6 is connected through a screen-control element 7 to a display screen 8. The elements 7 and 8 may, for example, be a microcomputer and its display screen.

The purpose of the screen 8 is to show an operator the entire environment of his ship through the use of data received from surrounding equipped ships as well as data received from his own equipment. FIG. 2 shows a non-restrictive example of data that could be displayed on the screen 8. This data can be displayed in a form similar to that of a panoramic radar screen.

According to the example of FIG. 2, the screen 8 displays the various ships (10, 11, 12 for example) in the form of big dots of light while its own ship (reference 13) has a color and/or shape and/or brightness different from that of the other ships. Furthermore, variously shaped and/or colored dots may correspond to different types of ships. Each dot representing a ship is extended by a straight line segment representing the speed vector of the corresponding ship. The length of this vector is proportionate to the ship's speed and its direction corresponds to the ship's course. Advantageously, a special symbol, for example a differently colored dot or a line, can be used to represent data on change in course. This data can be represented close to the speed vector data, to its right or to its left depending on the direction of the change. In its general presentation, the screen 8 may have the North located towards its top, but the top of the screen may also, advantageously, be made to correspond to the ship's prow, this ship's lubber line being then fixed. The speed vector of each ship may correspond to an absolute speed, or else, in an alternative embodiment, to a speed relative to that of the ship 13 (whose own speed vector is then nil): the various relative speed vectors of the other ships are then determined by the vectorial composition of their inherent speed and that of the ship 13. The dot representing the ship 13 may be either located at the center of the screen or off-centered in a direction opposite to its speed vector to favor "viewing from the bridge".

Advantageously, the identity of each ship (10A, 11A, 12A respectively) is displayed close to the dot representing each other ship.

Also advantageously, each equipped ship has a radar enabling it to detect neighbouring non-equipped ships or ships with malfunctioning equipment as well as fixed obstacles such as rocks, coasts, etc. FIG. 2 shows two echos 14, 15 representing non-equipped ships as well as the outline 16 of a coast. The echos 14, 15 are preferably displayed in a shape and/or color different from that of the dots 10 to 13 so that the operator can immediately see that they correspond to non-equipped ships or ships whose equipment is malfunctioning and that, when there is no corresponding speed vector, it does not mean that these ships have no speed.

All the transforms of coordinates, of vectors and, as the case may be, of data from the on-board radar are done in a manner known per se by the control element 7, the making of which will be obvious to those skilled in the art from a reading of the present invention.

Furthermore, fixed data stored in a mass-storage memory can also be given to the control element 7. It is thus possible to display cartographic data, such as coasts, buoys, lighthouses, etc.

According to an advantageous alternative embodiment of the invention, a ship's equipment further includes a radio call recognition circuit 9 connected firstly to the output of the demodulator 6 and, secondly, to a data input keyboard (not shown) on which the operator composes the call signal of the ship with which he wishes to make contact, this call signal being also sent to the modulator 4 and incorporated in the message transmitted periodically by the transmitter 1. The circuit may be a simple comparator which, in the called ship, compares the call signal received from the calling ship with its own call signal and (in the event of equality) sets off a sonic and/or visual alarm. Of course the message received by the called ship contains the call signal of the calling ship, and this call signal can be displayed on the screen 8 of the called ship. This display may be done, for example, in uncoded form (an alphanumerical call signal) in a corner of the screen. According to an advantageous alternative embodiment, instead of this display or in addition to this display, a symbol may appear near the point (such as one of the dots 10 to 12) representing the calling ship, or else this dot itself could be modified: the symbol may be, for example, a circle surrounding the dot that represents the calling ship and/or this dot may be flashing or its brightness may be increased.

According to another alternative embodiment of the invention, the screen control element 7 is associated with a "mouse" type device commonly used with microcomputers. This device produces a movable marker 17 on the screen 8, the marker being, for example, cross shaped. When this marker is superimposed on the symbol representing a ship which the operator wishes to call by radio, the operator handles the triggering button or "click" of the "mouse". This command is processed by the element 7 which produces a corresponding call signal (symbolized by the broken line 18) and sends it to the modulator 4. To produce this call signal, the element 7 memorizes the numbers received from all the neighbouring ships (displayed on the screen 8), establishes a relationship between the point at which the marker 17 has stopped and the corresponding call signal and sends this signal. The creation of these functions, performed by the element 17, is obvious to those skilled in the art, and will therefore not be described in greater detail. Of course, in the called ship, the said "mouse" can be used to acknowledge the call and, if necessary, to trigger a radio link. The use of a "mouse" prevents possible errors, caused by a wrong input of the call signal at the keyboard, in both ships (i.e. the calling ship and the called ship).

What is claimed is:

1. A collision-avoiding navigational method for an equipped sea-going vessel, comprising the steps of:
   automatically and continuously transmitting a periodic encoded data signal by said equipped sea-going vessel relating to said vessel's absolute geographic position, course and speed, wherein the periodic encoded data signal has a random periodicity;
   receiving encoded data signals from other equipped sea-going vessels related to said other vessels' absolute geographic position, course and speed, said other equipped sea-going vessels being within a predetermined radial distance from said equipped sea-going vessel;
   detecting a geographic position of not equipped sea-going vessels by radar;
   detecting fixed obstacles by radar;
   displaying information contained in the encoded data signals received from said other equipped sea-going vessels on a panoramic type of screen, said information being visualized by symbols corresponding to each of said other equipped sea-going vessels;
   displaying a position of said equipped sea-going vessel with a first symbol on the panoramic type of screen;
   displaying said other equipped sea-going vessel's absolute geographic position with second symbols on said panoramic type of screen;
   displaying said not equipped sea-going vessels geographic position, as detected by said radar, with third symbols on said panoramic type of screen;
   displaying the course and speed of said other equipped sea-going vessels symbolically on said panoramic type of screen; and
   displaying the fixed obstacles on said panoramic type of screen.

2. A method according to claim 1, further comprising the steps of:
   transmitting of data by said equipped sea-going vessel relating to said equipped sea-going vessel's identity;
   receiving data transmitted from said other equipped sea-going vessels relating to the identity of said other equipped sea-going vessels;
   displaying said data relating to the identity of said other equipped sea-going vessels near the symbols corresponding to each of said other equipped sea-going vessels on said panoramic type screen.

3. A method of claim 1, further comprising the steps of:
   transmitting data by said equipped sea-going vessel relating to a change in said equipped sea-going vessel's course;
   receiving data from said other equipped sea-going vessels relating to changes in said other equipped sea-going vessels' courses;
   displaying change of course data received from said other equipped sea-going vessels on said panoramic type screen.

4. A method according to claim 1, further comprising the steps of:
   performing radar scanning to detect obstacles, within said predetermined radial distance, besides said other equipped sea-going vehicles;
   displaying said obstacles on said panoramic type screen with any ships comprising a part of said obstacles being designated by symbols different from the signals designating said other equipped sea-going vessels.

5. The method of claim 1, further comprising the steps of:
   digitizing and assembling said encoded data of said other sea-going vessels in a byte.

6. A method according to claim 1, further comprising the step of:
   displaying the speeds of said other equipped sea-going vessels in the form of speed vectors on said panoramic type of screen, said speed vectors being relative to said equipped sea-going vessel's speed.

7. A method according to claim 2, further comprising the step of:
   transmitting a call signal of a particular vessel of said other equipped sea-going vessels such that if said particular vessel receives and identifies said call signal as said particular vessel's own call signal, an alarm sounds indicating that radio contact should be made with said equipped sea-going vessel.

8. A method according to claim 2, wherein said vessel identity data includes an identification of a type of ship.

* * * * *

UNITED STATES PATENT AND TRADEMARK OFFICE
CERTIFICATE OF CORRECTION

PATENT NO. : 5,307,074
DATED : April 26, 1994
INVENTOR(S) : Albert JANEX

It is certified that error appears in the above-indentified patent and that said Letters Patent is hereby corrected as shown below:

On the title page, Item [63], the PCT information has been omitted from the Related U.S. Application Data and should read as follows:

--Continuation of Ser. No. 758,216, Sep. 12, 1991, abandoned, which is a continuation of Ser. No. 641,804, Jan. 16, 1991, abandoned, which is a continuation of Ser. No. 498,446, Mar. 16, 1990, abandoned, which is a continuation of Ser. No. 167,475, Apr. 25, 1988, filed as PCT/FR87/00263, Jul. 6, 1987, abandoned.--

Signed and Sealed this

Sixteenth Day of August, 1994

*Attest:*

BRUCE LEHMAN

*Attesting Officer*   Commissioner of Patents and Trademarks